(12) United States Patent
Nakada et al.

(10) Patent No.: US 11,981,117 B2
(45) Date of Patent: May 14, 2024

(54) LIQUID ABSORBING SHEET (71) Applicant: SEIKO EPSON CORPORATION, Tokyo (JP)

(72) Inventors: Shogo Nakada, Nagano (JP); Taiki Kono, Nagano (JP); Akihiro Toya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,864

(22) Filed: Feb. 14, 2022

(65) Prior Publication Data
US 2022/0258451 A1  Aug. 18, 2022

(30) Foreign Application Priority Data
Feb. 15, 2021 (JP) ................. 2021-021508

(51) Int. Cl.
*B32B 7/14* (2006.01)
*B32B 5/02* (2006.01)
*B32B 27/12* (2006.01)
*B41J 29/17* (2006.01)

(52) U.S. Cl.
CPC .................. *B32B 7/14* (2013.01); *B32B 5/02* (2013.01); *B32B 27/12* (2013.01); *B41J 29/17* (2013.01); *B32B 2250/03* (2013.01); *B32B 2250/40* (2013.01); *B32B 2307/718* (2013.01); *B32B 2307/726* (2013.01)

(58) Field of Classification Search
None
See application file for complete search history.

(56) References Cited

U.S. PATENT DOCUMENTS

| | | | | |
|---|---|---|---|---|
| 2006/0004334 | A1* | 1/2006 | Schlinz | A61F 13/534 604/366 |
| 2006/0275580 | A1* | 12/2006 | Rodriguez | B32B 29/005 428/126 |
| 2012/0258851 | A1* | 10/2012 | Nakatsuru | C08J 3/12 502/7 |
| 2014/0322143 | A1* | 10/2014 | Feldstein | A61K 8/042 523/122 |
| 2021/0298962 | A1* | 9/2021 | Ge | A61L 15/60 |

FOREIGN PATENT DOCUMENTS

| | | | | |
|---|---|---|---|---|
| JP | 2019-136152 A | 8/2019 | | |
| WO | WO-9745084 A1 * | 12/1997 | ....... | A61F 13/15642 |
| WO | WO-2020025400 A1 * | 2/2020 | ........... | A61F 13/472 |

* cited by examiner

*Primary Examiner* — Tamra L. Dicus
(74) *Attorney, Agent, or Firm* — Global IP Counselors, LLP (57) ABSTRACT

A liquid absorbing sheet includes: a receiving base material which has a liquid permeability and which includes a first base material, a second base material, and a bonding portion at which the first base material and the second base material are bonded to each other at margins thereof, the first base material and the second base material each being composed of a material including fibers; and a water absorbing resin which has a water absorbing property, which is swelled in association with water absorption, and which is received in a portion between the first base material and the second base material surrounded by the bonding portion. In the liquid absorbing sheet described above, the bonding portion is at least partially broken when the water absorbing resin is swelled.

9 Claims, 7 Drawing Sheets

LIQUID ABSORBING SHEET

The present application is based on, and claims priority from JP Application Serial Number 2021-021508, filed Feb. 15, 2021, the disclosure of which is hereby incorporated by reference herein in its entirety.

BACKGROUND

1. Technical Field

The present disclosure relates to a liquid absorbing sheet.

2. Related Art

For example, in an ink jet printer, when a head cleaning operation is performed to prevent degradation in printing quality caused by ink clogging, and/or when an ink filling operation is performed after an ink cartridge is changed, a waste ink may be generated. In addition, ink leakage may occur in some cases from an unexpected position of an ink jet printer. Heretofore, an ink absorbing body to absorb the ink as described above has been known.

For example, JP-A-2019-136152 has disclosed a SAP sheet in which between a first sheet and a second sheet each of which is formed from a fibrous material, particle groups of SAP which is a superabsorbent polymer are enclosed.

However, when SAP is enclosed, while a liquid is absorbed, a swelling limit of the SAP sheet comes, and the swelling thereof is restricted; hence, subsequently, the liquid cannot be further absorbed. That is, before absorbing an absorbable amount, SAP cannot further absorb the liquid. As a result, a sufficient liquid amount cannot be absorbed.

SUMMARY

According to an aspect of the present disclosure, there is provided a liquid absorbing sheet comprising: a receiving base material which has a liquid permeability and which includes a first base material, a second base material, and a bonding portion at which the first base material and the second base material are bonded to each other at margins thereof, the first base material and the second base material each being composed of a material including fibers; and a water absorbing resin which has a water absorbing property, which is swelled in association with water absorption, and which is received in a portion between the first base material and the second base material surrounded by the bonding portion. In the liquid absorbing sheet described above, the bonding portion is at least partially broken when the water absorbing resin is swelled.

DESCRIPTION OF EXEMPLARY EMBODIMENTS

Hereinafter, a liquid absorbing sheet of the present disclosure will be described in detail with reference to preferable embodiments shown in the attached drawings.

First Embodiment

Figure 1:
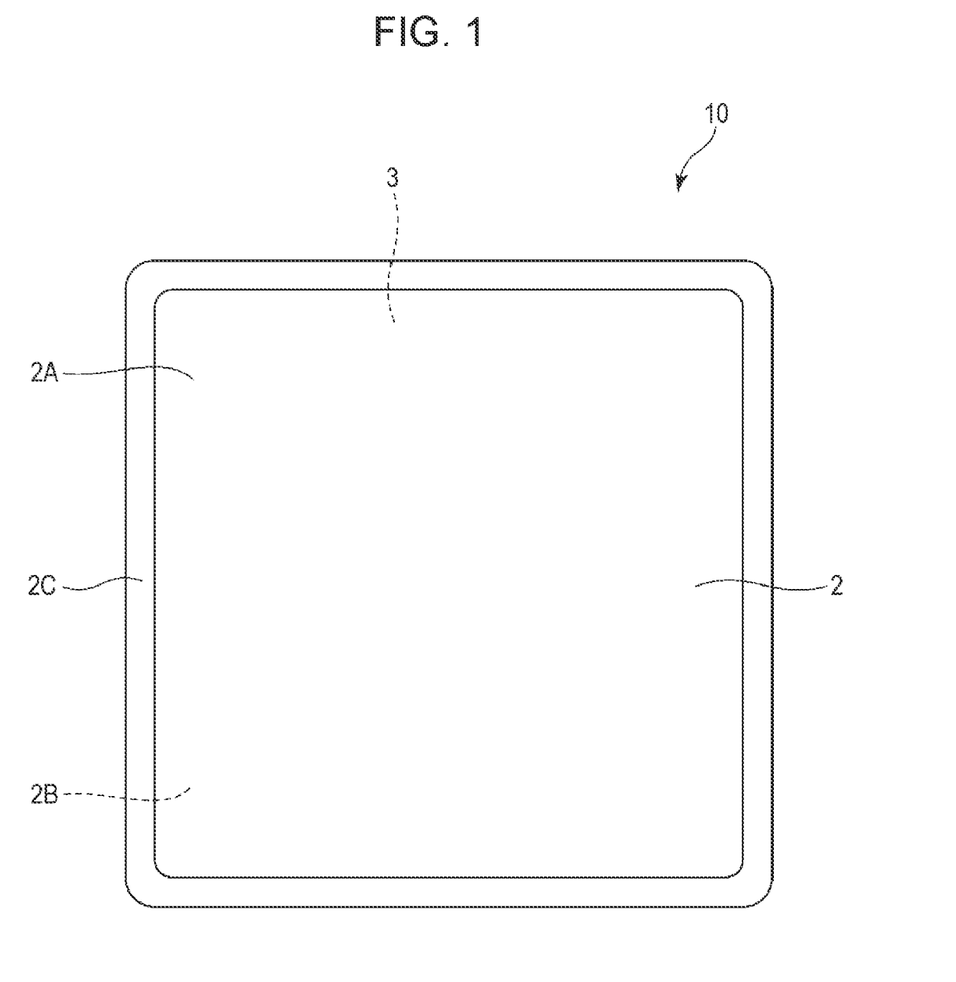
FIG. 1 is a plan view of a first embodiment of a liquid absorbing sheet of the present disclosure.
Figure 2:
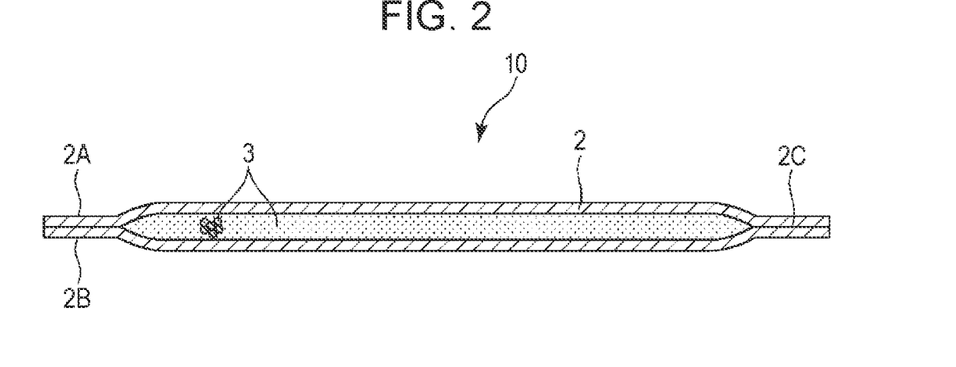
FIG. 2 is a cross-sectional view of the liquid absorbing sheet shown in FIG. 1.
Figure 3:
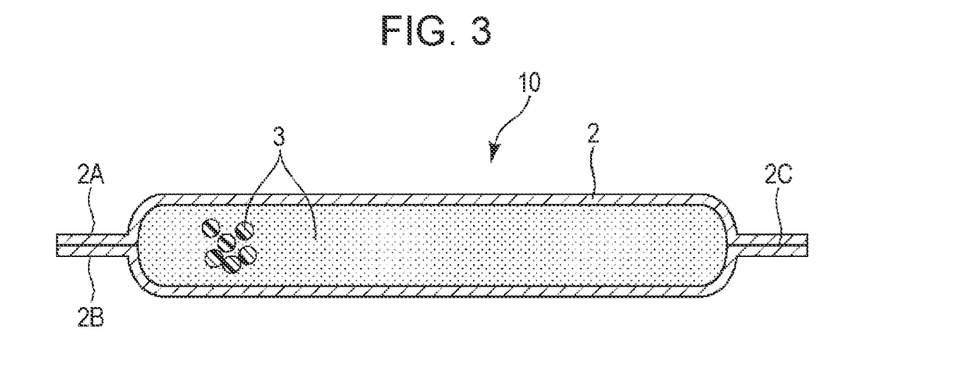
FIG. 3 is a cross-sectional view of the liquid absorbing sheet shown in FIG. 1.
Figure 4:
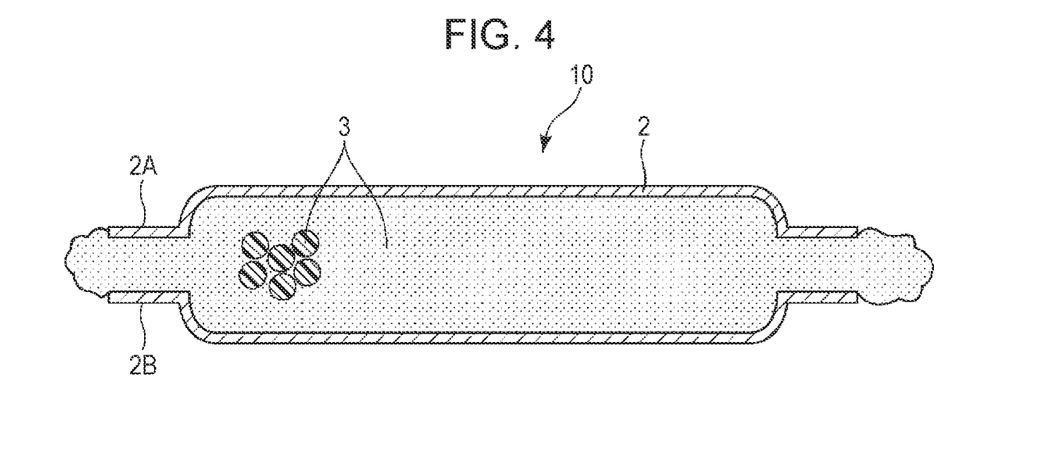
FIG. 4 is a cross-sectional view of the liquid absorbing sheet shown in FIG. 1.
Figure 5:
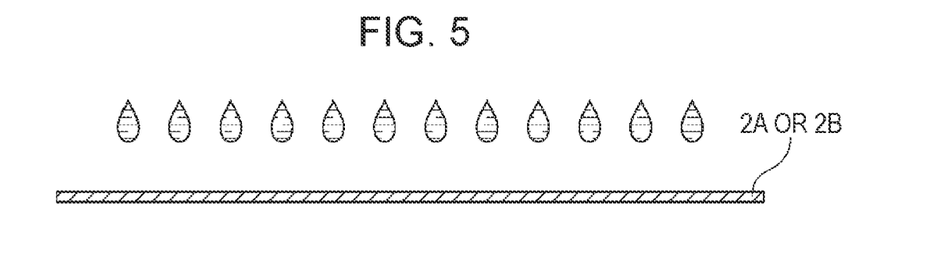
FIG. 5 is a cross-sectional view illustrating a method for manufacturing the liquid absorbing sheet shown in FIG. 1.
Figure 6:
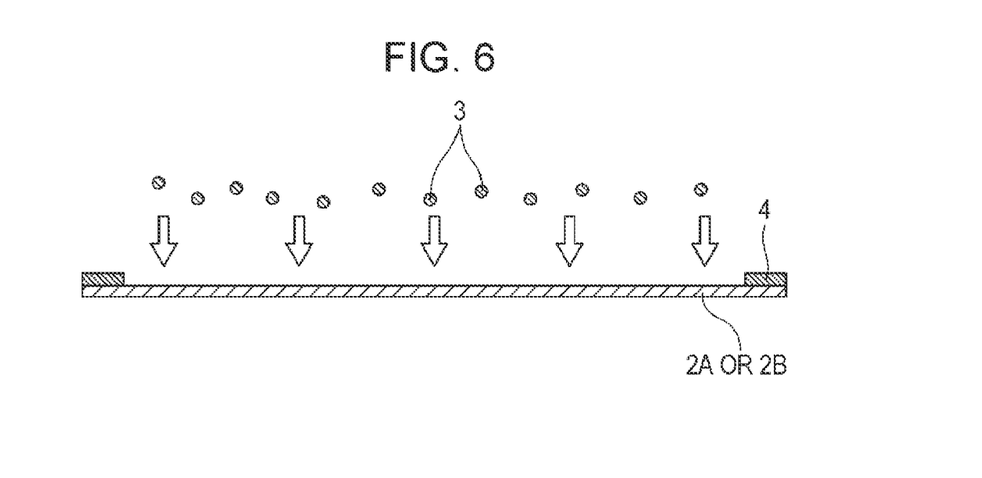
FIG. 6 is a cross-sectional view illustrating the method for manufacturing the liquid absorbing sheet shown in FIG. 1.
Figure 7:
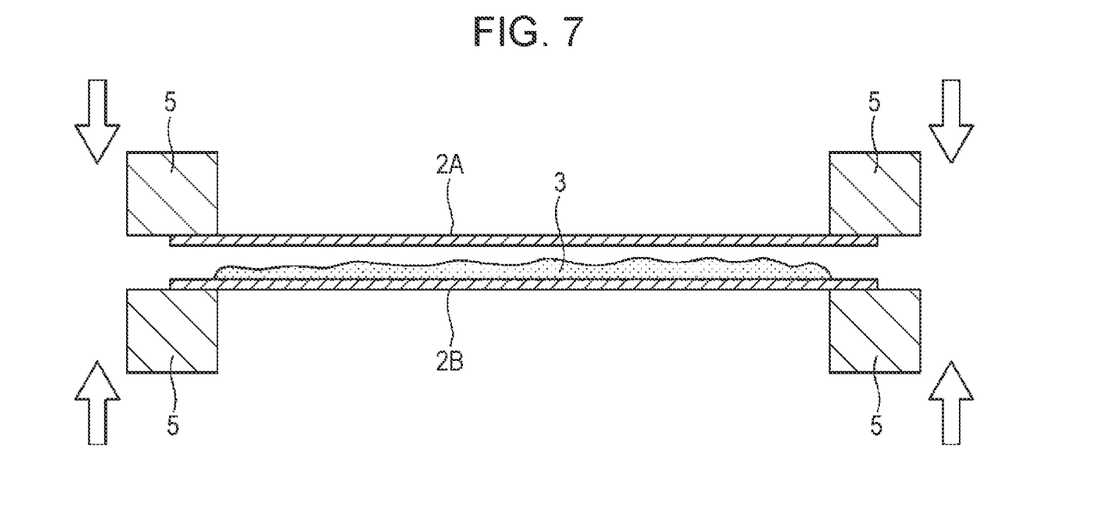
FIG. 7 is a cross-sectional view illustrating the method for manufacturing the liquid absorbing sheet shown in FIG. 1.

FIG. 1 is a plan view of a first embodiment of the liquid absorbing sheet of the present disclosure. FIGS. 2 to 4 are each a cross-sectional view of the liquid absorbing sheet shown in FIG. 1. FIGS. 5 to 7 are each a cross-sectional view illustrating a method for manufacturing the liquid absorbing sheet shown in FIG. 1.

In addition, hereinafter, for the convenience of description, in FIGS. 2 to 8 (also in FIG. 9 and FIG. 10), an upper side and a lower side are also called "over (or above)" and "under (or below)", respectively, in some cases.

As shown in FIGS. 1 to 4, a liquid absorbing sheet 10 includes a receiving base material 2 having a liquid permeability and a water absorbing resin 3 received in the receiving base material 2. A liquid dripping or permeating from the outside to the receiving base material 2 permeates through the receiving base material 2 and is then absorbed and held by the water absorbing resin 3 received therein.

In addition, as the liquid, for example, water, an ink, or a body fluid may be mentioned. In addition, as the ink, there may be mentioned, besides a water-based ink in which a colorant is dissolved in a water-based solvent, a solvent-based ink in which a binder is dissolved in a solvent, an UV curable ink in which a binder is dissolved in a liquid monomer to be cured by UV irradiation, or a latex ink in which a binder is dispersed in a dispersion medium. Hereinafter, a liquid absorbed by the water absorbing resin 3 will be described as the ink.

The receiving base material 2 has a first sheet 2A functioning as a first base material, a second sheet 2B functioning as a second base material, and a bonding portion 2C at which the first sheet 2A and the second sheet 2B are bonded to each other at margins thereof. The first sheet 2A and the second sheet 2B are each formed from a material including fibers.

According to the structure shown in the drawing, although a plan-view shape of each of the first sheet 2A and the second sheet 2B is an approximately square shape, the shape is not limited thereto, and for example, any shape, such as a rectangular shape, a circular shape, an oval shape, or a polygonal shape, may be mentioned.

As the fibers, for example, synthetic resin fibers, such as polyester fibers or polyamide fibers; natural resin fibers, such as cellulose fibers, keratin fibers, or fibroin fibers: or chemical modified fibers thereof may be mentioned, and those fibers may be used alone, or at least two types thereof may be appropriately used in combination. However, fibers primarily formed from cellulose fibers are preferable, and fibers almost all formed from cellulose fibers are more preferable.

Since a cellulose is a material having a preferable hydrophilic property, when an ink is applied to the liquid absorbing sheet 10, the ink is preferably incorporated therein and can be rapidly evacuated from a highly fluidized state (such as a state in which the viscosity is 10 mPa·s or less), and in addition, the ink incorporated once can be preferably transferred in the water absorbing resin 3. As a result, ink absorption characteristics of the whole liquid absorbing sheet 10 can be particularly improved. In addition, since being a regenerable natural raw material and easily available at low cost among various types of fibers, the cellulose fibers are also advantageous, for example, in terms of reduction in production cost of the liquid absorbing sheet 10, stable production thereof, and reduction in environmental load.

In addition, in this specification, as the cellulose fibers, a material in the form of fibers containing a cellulose as a primary component may be mentioned, and besides the material containing a cellulose, a material containing a hemicellulose or a lignin may also be mentioned.

Although an average length of the fibers is not particularly limited, the average length thereof is preferably 0.1 to 7 mm, more preferably 0.1 to 5 mm, and further preferably 0.1 to 3 mm. Although an average width (diameter) of the fibers is not particularly limited, the average width thereof is preferably 0.05 to 2 mm and more preferably 0.1 to 1 mm.

Although an average aspect ratio (ratio of the average length to the average width) of the fibers is not particularly limited, the average aspect ratio thereof is preferably 10 to 1,000 and more preferably 15 to 500.

By the numerical ranges as described above, the support of the water absorbing resin 3, the ink holding by the fibers, and the ink transfer in the water absorbing resin 3 can be preferably performed. Hence, the ink absorption characteristics of the whole liquid absorbing sheet 10 can be further improved.

The first sheet 2A may be formed from the same material as or a different material from that of the second sheet 2B.

In addition, although a thickness of each of the first sheet 2A and the second sheet 2B is not particularly limited, for example, the thickness described above is preferably 0.1 to 10 mm and more preferably 0.5 to 5 mm. Accordingly, the ink holding by the fibers and the ink transfer in the water absorbing resin 3 can be more preferably performed. Hence, the ink absorption characteristics of the whole liquid absorbing sheet 10 can be further improved.

In addition, the thickness of the first sheet 2A may be the same as or different from that of the second sheet 2B.

In addition, although a fiber density of each of the first sheet 2A and the second sheet 2B is not particularly limited, for example, the fiber density described above is preferably 0.01 to 0.5 g/cm$^3$ and more preferably 0.05 to 0.3 g/cm$^3$. Accordingly, the ink permeability by the fibers can be further improved. Accordingly, the ink absorption characteristics of the whole liquid absorbing sheet 10 can be further improved. In addition, particles of the water absorbing resin 3 can be prevented from unfavorably escaping between the fibers.

In addition, the first sheet 2A and the second sheet 2B each preferably contain, besides the fibers described above, a binder to bind the fibers to each other. Accordingly, a strength of each of the first sheet 2A and the second sheet 2B can be sufficiently increased, and the first sheet 2A and the second sheet 2B can be prevented from being broken at an unintentional part thereof.

The binder is not particularly limited, and for example, there may be used a thermoplastic resin, a curable resin, a starch, a dextrin, a glycogen, an amylose, a hyaluronic acid, a kuzu, a konjak, a potato starch, an etherified starch, an esterified starch, a natural gum glue (an etherified tamarind gum, an etherified locust bean gum, an etherified guar gum, or an acacia gum arabic), a fiber-derived glue (an etherized carboxymethyl cellulose or a hydroxyethyl cellulose), a seaweed (a sodium alginate or an agar), or an animal protein (such as a collagen, a gelatin, a hydrolysable collagen, or a sericin), and a thermoplastic resin is preferably used.

As the thermoplastic resin, for example, there may be mentioned a polyolefin resin, such as an AS resin, an ABS resin, a polyethylene, a polypropylene, an ethylene-vinyl acetate copolymer (EVA), or a modified polyolefin; an acrylic resin such as a poly(methyl methacrylate); a polyvinyl resin, such as a poly(vinyl chloride) or a polystyrene; a polyester, such as a poly(ethylene terephthalate) or a poly(butylene terephthalate); a polyamide (nylon), such as a nylon 6, a nylon 46, a nylon 66, a nylon 610, a nylon 612, a nylon 11, a nylon 12, a nylon 6-12, or a nylon 6-66; a poly(phenylene ether), a polyacetal, a polyether, a poly(phenylene oxide), a poly(ether ether ketone), a polycarbonate, a poly(phenylene sulfide), a thermoplastic polyimide, a poly(ether imide), a liquid crystal polymer such as an aromatic polyester, or a thermoplastic elastomer, such as a styrene-based, a polyolefin-based, a poly(vinyl chloride)-based, a polyurethane-based, a polyester-based, a polyamide-based, a polybutadiene-based, a trans-polyisoprene-based, a fluorine rubber-based, or a chlorinated polyethylene-based thermoplastic elastomer. Those compounds mentioned above may be used alone, or at least two types thereof may be used in combination. As the thermoplastic resin, a polyester or a compound containing a polyester is preferably used.

In addition, besides the binder described above, for example, a colorant to color the fibers, an aggregation inhibitor to suppress aggregation of the fibers and aggregation of the binder, a flame retardant agent to enable the fibers or the like to be difficult to combust, and a paper strength enhancer to increase a paper strength of each of the first sheet 2A and the second sheet 2B may also be contained.

The bonding portion 2C is a portion at which the first sheet 2A and the second sheet 2B are bonded to each other at the margins thereof. In this embodiment, the entire margins of the first sheet 2A and the second sheet 2B are bonded to each other so as to form a frame shape in plan view.

A bonding method of the bonding portion 2C is not particularly limited, and for example, fusion bonding, such as thermal fusion bonding or ultrasonic fusion bonding, adhesion using an adhesive, or pressure bonding may be mentioned and may be used alone, or at least two types thereof may be used in combination.

In addition, since at least one of the first sheet 2A and the second sheet 2B contains the binder as described above, the first sheet 2A and the second sheet 2B can be bonded to each other by thermal fusion bonding. In addition, when a particle diameter and an amount of the binder contained in the first sheet 2A or the second sheet 2B are appropriately determined, a bonding strength can be easily controlled.

In the case of the bonding using an adhesive, although an adhesive to be used is not particularly limited, for example, a water-soluble adhesive or an organic-based adhesive may be used, and in particular, a water-soluble adhesive is preferable. Accordingly, when the ink is a water base, since the water-soluble adhesive is dissolved when the ink is in contact with the adhesive, the breakage of the bonding portion 2C can be promoted.

As the water-soluble adhesive, for example, there may be mentioned various types of proteins, such as a casein, a soybean protein, and a synthetic protein; various types of starches, such as a starch and an oxidized starch; various types of poly(vinyl alcohol)s, such as a poly(vinyl alcohol), a cationic poly(vinyl alcohol), and a modified poly(vinyl alcohol) including a silyl-modified poly(vinyl alcohol); cellulose derivatives, such as a carboxymethyl cellulose and a methyl cellulose; a water-based polyurethane resin, and a water-based polyester resin.

In addition, in this embodiment, a bonding strength at the bonding portion 2C is regarded to be approximately the same over the entire region.

In a portion surrounded by the bonding portion 2C as described above, the water absorbing resin 3 is received. The water absorbing resin 3 has a water absorbing property and is a resin to be swelled in association with water absorption. Although the water absorbing resin 3 is not particularly limited, for example, there may be mentioned a carboxymethyl cellulose, a poly(acrylic acid), a polyacrylamide, a starch-acrylic acid graft copolymer, a starch-acrylonitrile graft copolymer hydrolysate, a vinyl acetate-acrylate copolymer, a copolymer between isobutylene and maleic acid, an acrylonitrile copolymer hydrolysate, an acrylamide copolymer hydrolysate, a poly(ethylene oxide), a polysulfonic acid-based compound, a polyglutamic acid, a salt (neutralized product) of one of those mentioned above, or a cross-linked product thereof. In addition, the water absorbing property indicates a hydrophilic property and has a function to hold moisture. When absorbing water, many water absorbing resins 3 are gelled.

In addition, as the water absorbing resin 3, a resin having a functional group at a side chain is preferable. As the functional group, for example, an acid group, a hydroxy group, an epoxy group, or an amino group may be mentioned.

In particular, the water absorbing resin 3 is preferably a resin having an acid group at a side chain and more preferably a resin having a carboxy group at a side chain.

As a carboxy group-containing unit forming the side chain, for example, there may be mentioned a unit derived from a monomer, such as acrylic acid, methacrylic acid, itaconic acid, maleic acid, crotonic acid, fumaric acid, sorbic acid, cinnamic acid, an anhydride of one of those mentioned above, or a salt thereof.

When a water absorbing resin 3 having an acid group at a side chain is contained, among acid groups contained in the water absorbing resin 3, a rate of acid groups formed into salts by neutralization is preferably 30 to 100 percent by mole, more preferably 50 to 95 percent by mole, and further preferably 60 to 90 percent by mole. Accordingly, an ink absorbing property by the water absorbing resin 3 (liquid absorbing sheet 10) can be further improved.

Although the type of salt thus neutralized is not particularly limited, for example, an alkali metal salt, such as a sodium salt, a potassium salt, or a lithium salt, or a salt of a nitrogen-containing basic compound, such as ammonium, may be mentioned, and in particular, a sodium salt is preferable. Accordingly, the ink absorbing property by the water absorbing resin 3 (liquid absorbing sheet 10) can be further improved.

In the water absorbing resin 3 having an acid group at a side chain, since electrostatic repulsion occurs between the acid groups during ink absorption, an absorption rate is preferably increased. In addition, when the acid group is neutralized, by an osmotic pressure, the ink is likely to be absorbed in the water absorbing resin 3.

The water absorbing resin 3 may have a constituent unit containing no acid groups at a side chain, and as the constituent unit as described above, for example, a hydrophilic constituent unit, a hydrophobic constituent unit, or a constituent unit functioning as a polymerizable cross-linking agent may be mentioned.

As the hydrophilic constituent unit described above, for example, there may be mentioned a constituent unit derived from a nonionic compound, such as acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl(meth)acrylate, 2-hydroxypropyl(meth)acrylate, a methoxypolyethylene glycol (meth)acrylate, a polyethylene glycol mono(meth)acrylate, N-vinyl pyrrolidone, N-acryloylpiperidine, or N-acryloylpyrrolidine.

As the hydrophobic constituent unit described above, for example, there may be mentioned a constituent unit derived from a compound, such as (meth)acrylonitrile, styrene, vinyl chloride, butadiene, isobutene, ethylene, propylene, stearyl (meth)acrylate, or lauryl (meth)acrylate.

As the constituent unit functioning as a polymerizable cross-linking agent described above, for example, there may be mentioned a constituent unit derived from diethylene glycol diacrylate, N,N-methylene bisacrylamide, a polyethylene glycol diacrylate, a polypropylene glycol diacrylate, trimethylolpropane diallyl ether, trimethylolpropane triacrylate, allyl glycidyl ether, pentaerythritol triallyl ether, pentaerythritol diacrylate monostearate, bisphenol diacrylate, isocyanurate diacrylate, tetraallyloxyethane, or diallyloxy acetate.

The water absorbing resin 3 preferably includes a polyacrylate salt copolymer or a polyacrylic acid cross-linked polymer. Accordingly, for example, advantages, such as improvement in liquid absorption performance and reduction in production cost, may be obtained.

As the polyacrylic acid cross-linked polymer, a rate of constituent units having a carboxy group occupied in the total constituent units forming a molecular chain is preferably 50 percent by mole or more, more preferably 80 percent by mole or more, and further preferably 90 percent by mole or more.

When the rate of constituent units having a carboxy group is excessively low, it may become difficult in some cases to sufficiently improve the ink absorption performance.

The carboxy group in the polyacrylic acid cross-linked polymer is preferably partially neutralized (partial neutralization) to form a salt.

A rate of neutralized carboxy groups occupied in the total carboxy groups in the polyacrylic acid cross-linked polymer is preferably 30 to 99 percent by mole, 50 to 99 percent by mole, and further preferably 70 to 99 percent by mole.

In addition, the water absorbing resin 3 may also have a structure cross-linked by a cross-linking agent other than the polymerizable cross-linking agent described above.

When the water absorbing resin 3 is a resin having an acid group, as the cross-linking agent described above, for example, a compound having a plurality of functional groups to reach with an acid group is preferably used.

When the water absorbing resin 3 is a resin having a functional group to react with an acid group, as the cross-linking agent, for example, a compound having a plurality of acid groups in its molecule is preferably used.

As the compound (cross-linking agent) having a plurality of functional groups to react with an acid group, for example, there may be mentioned a glycidyl ether compound, such as ethylene glycol diglycidyl ether, trimethylolpropane triglycidyl diether, a (poly)glycerin polyglycidyl diether, a diglycerin polyglycidyl diether, or propylene glycol diglycidyl ether; a polyvalent alcohol, such as a (poly) glycerin, a (poly)ethylene glycol, propylene glycol, 1,3-propanediol, a polyoxyethylene glycol, triethylene glycol, tetraethylene glycol, diethanolamine, or triethanolamine; or a polyvalent amine, such as ethylenediamine, diethylenediamine, a polyethyleneimine, or hexamethylenediamine. In addition, since a polyvalent ion, such as zinc, calcium, magnesium, or aluminum, also functions as a cross-linking agent to react with the acid group of the water absorbing resin 3, the polyvalent ion described above may also be preferably used.

Although the water absorbing resin 3 may have any shapes, such as scale, needle, fiber, or particle shapes, the water absorbing resin 3 are preferably mostly in the form of particles. When the water absorbing resin 3 is in the form of particles, the ink permeability can be easily secured. An average particle diameter of the particles is preferably 10 to 1,000 μm, more preferably 50 to 800 μm, and further preferably 100 to 600 μm.

In addition, the receiving base material 2 may also contain components (other components) other than the water absorbing resin 3. As the components described above, for example, there may be mentioned a surfactant, a lubricant, a defoaming agent, a filler, an ion-exchange resin, an activated carbon, a zeolite, a blocking inhibitor, an UV absorber, a colorant such as a pigment or a dye, a flame retardant agent, and/or a flow improver.

In addition, when the ink permeates into the liquid absorbing sheet 10, and the water absorbing resin 3 absorbs the ink, as shown in FIG. 3, the water absorbing resin 3 is swelled. In addition, when the ink is further absorbed, as shown in FIG. 4, by the water absorbing resin 3 thus swelled, the first sheet 2A and the second sheet 2B are pushed in respective directions so as to be apart from each other, and the bonding portion 2C is broken. Hence, the water absorbing resin 3 thus swelled flows out of the receiving base material 2 through the broken portion described above. According to the structure as described above, when the ink is not absorbed, or when an ink absorption amount is relatively small, the water absorbing resin 3 is received in the receiving base material 2 so as to be compacted therein and is prevented from flowing out. In addition, when the ink absorption amount is more than a predetermined amount, the bonding portion 2C is broken, and the water absorbing resin 3 can be swelled by further absorption of the ink, so that the whole water absorbing resin 3 can sufficiently absorb the ink. Hence, the liquid absorbing sheet 10 is configured to be compacted before the ink is sufficiently absorbed therein, and when the ink is absorbed, a sufficient ink amount can be absorbed.

In particular, in the case of this embodiment, since the bonding strength is approximately the same along the bonding portion 2C, when the swelling of the water absorbing resin 3 proceeds, the first sheet 2A and the second sheet 2B are likely to be separated from each other over the entire region of the bonding portion 2C. Hence, the swelling of the water absorbing resin 3 in a thickness direction of the liquid absorbing sheet 10 is not disturbed. As a result, the ink absorption amount by the whole water absorbing resin 3 can be more efficiently increased.

In addition, a volume of the water absorbing resin 3 under dry conditions, that is, before the ink is absorbed, is represented by V1, and a volume thereof when the ink is maximally absorbed is represented by V2, V2/V1 is preferably 2 to 1,000 and more preferably 5 to 250. Accordingly, a sufficient ink amount can be absorbed, and in addition, the bonding portion 2C can be more reliably broken.

In addition, when the water absorbing resin 3 absorbs a liquid in an amount of 0.5 to 20.0 g/cm$^3$, the bonding portion 2C is preferably configured so as to be at least partially broken, and when the water absorbing resin 3 absorbs a liquid in an amount of 2.0 to 10.0 g/cm$^3$, the bonding portion 2C is more preferably configured so as to be at least partially broken. Accordingly, a sufficient ink amount can be absorbed.

In addition, a weight (total weight) of the water absorbing resin 3 with respect to the total weight of the liquid absorbing sheet 10 in a state before liquid absorption is preferably 20% to 95% and more preferably 30% to 70%. Accordingly, a sufficient ink amount can be absorbed.

In addition, the weight of the water absorbing resin 3 per unit area of the liquid absorbing sheet 10 is preferably 100 to 1,000 g/m$^2$ and more preferably 200 to 800 g/m$^2$. Accordingly, a sufficient ink amount can be absorbed, and the bonding portion 2C can be configured to be easily broken.

In addition, although the water absorbing resin 3 may be or may not be supported by the receiving base material 2, the water absorbing resin 3 is preferably bonded to at least one of the first sheet 2A functioning as the first base material and the second sheet 2B functioning as the second base material. Accordingly, the water absorbing resin 3 thus received is prevented from excessively moving in the receiving base material 2. Hence, the ink can be uniformly absorbed.

As a method to support the water absorbing resin 3 by the receiving base material 2 is not particularly limited, and for example, there may be mentioned a method in which the water absorbing resin 3 is adhered to the receiving base material 2 using an adhesive or a method in which after moisture is applied so that the water absorbing resin 3 has an adhesive property, the water absorbing resin 3 is adhered to the receiving base material 2 by this adhesive property. When an adhesive is used, although an adhesive to be used is not particularly limited, the adhesive as described above may be used. In particular, a water-soluble adhesive is preferable. Accordingly, when the ink is a water-based ink, since the water-soluble adhesive is dissolved when the ink is in contact with the adhesive, the ink permeation in the water absorbing resin 3 can be prevented from being disturbed.

As has thus been described, the liquid absorbing sheet 10 includes: the receiving base material 2 which has a liquid permeability and which includes the first sheet 2A functioning as the first base material, the second sheet 2B functioning as the second base material, and the bonding portion 2C at which the first sheet 2A and the second sheet 2B are bonded to each other at the margins thereof, the first sheet 2A and the second sheet 2B each being composed of a material including fibers; and the water absorbing resin 3 which has a water absorbing property, which is swelled in association with water absorption, and which is received in the portion between the first sheet 2A and the second sheet 2B surrounded by the bonding portion 2C. In addition, the bonding portion 2C is at least partially broken by the swelling of the water absorbing resin 3. According to the structure as described above, when a liquid is not absorbed, or when a liquid absorption amount is relatively small, the water absorbing resin 3 is received in the receiving base material 2 so as to be compacted therein and is prevented from flowing out. In addition, when the liquid absorption amount is more than a predetermined amount, the bonding portion 2C is broken, and the water absorbing resin 3 can be swelled by further absorption of the liquid, so that the whole water absorbing resin 3 can sufficiently absorb the liquid. Hence, the liquid absorbing sheet 10 is configured to be compacted before the liquid is sufficiently absorbed therein, and when the liquid is absorbed, a sufficient liquid amount can be absorbed.

Next, one example of the method for manufacturing the liquid absorbing sheet 10 will be described.

First, the first sheet 2A, the second sheet 2B, the water absorbing resin 3, a mask 4, and a heating pressure jig 5 are prepared.

Next, as shown in FIG. 5, a water-soluble adhesive or water is applied to at least one of the first sheet 2A and the second sheet 2B. Subsequently, as shown in FIG. 6, on a surface to which the water-soluble adhesive or water is applied, the water absorbing resin 3 is sprayed. In this step, on a portion which is formed into the bonding portion 2C later, the mask 4, such as a masking tape, is disposed.

Next, after the mask 4 is removed, while the water absorbing resin is supported on the at least one of the first sheet 2A and the second sheet 2B, a water-soluble adhesive or water is applied thereto. In addition, as shown in FIG. 7, the first sheet 2A and the second sheet 2B are overlapped so that the water absorbing resin 3 is disposed therebetween and are then heated and pressurized using the heating pressure jig 5. In this step, the portion on which the mask 4 is disposed is heated and pressurized.

In addition, one of the heating and the pressuring may be omitted. In addition, an adhesive may also be applied between the first sheet 2A and the second sheet 2B.

Second Embodiment

Figure 8:
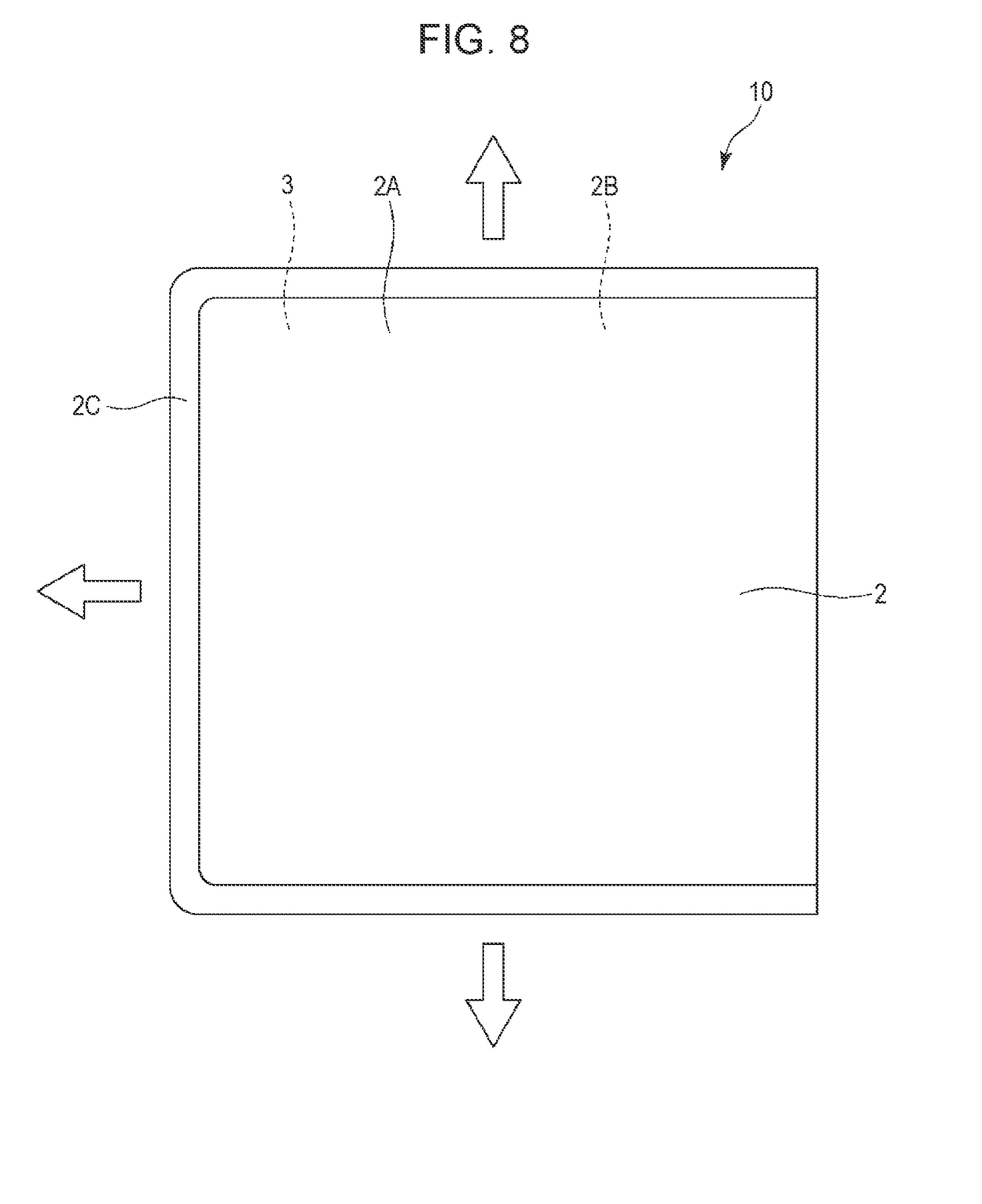
FIG. 8 is a plan view of a second embodiment of the liquid absorbing sheet of the present disclosure.
Figure 9:
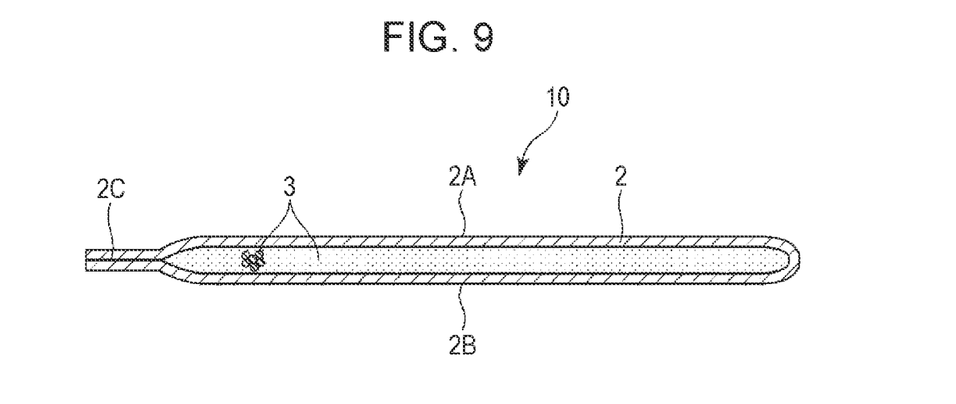
FIG. 9 is a cross-sectional view of the liquid absorbing sheet shown in FIG. 8.
Figure 10:
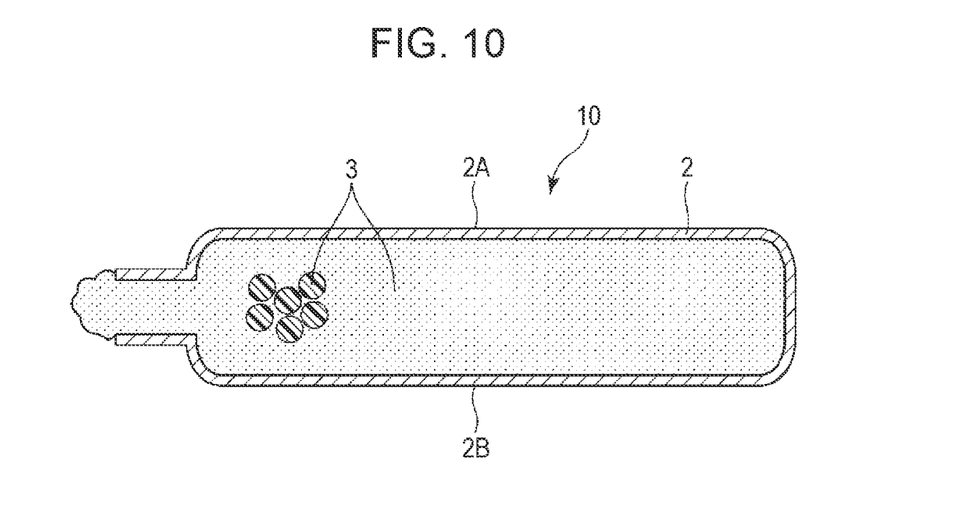
FIG. 10 is a cross-sectional view of the liquid absorbing sheet shown in FIG. 8.

FIG. 8 is a plan view of a second embodiment of the liquid absorbing sheet of the present disclosure. FIGS. 9 and 10 are each a cross-sectional view of the liquid absorbing sheet shown in FIG. 8.

Hereinafter, although the second embodiment of the liquid absorbing sheet of the present disclosure will be described with reference to those drawings, points different from those of the embodiment described above will be primarily described, and items similar to those described above will be omitted.

As shown in FIGS. 8 and 9, in the liquid absorbing sheet 10 of this embodiment, the receiving base material 2 is formed by folding a piece of sheet once. Of two parts of the sheet thus overlapped with each other by the folding, one part functions as the first sheet 2A, and the other part functions as the second sheet 2B. In other words, the first sheet 2A and the second sheet 2B are regarded to be connected to each other at parts of the margins thereof.

In addition, in this embodiment, the bonding portion 2C is formed by bonding parts of the margins other than the parts at which the first sheet 2A and the second sheet 2B are connected to each other. Hence, when the bonding portion 2C is broken as shown in FIG. 10, the water absorbing resin 3 protrudes in the arrow directions, that is, in the three directions, shown in FIG. 8, and no water absorbing resin 3 protrudes from the parts of the margins at which the first sheet 2A and the second sheet 2B are connected to each other.

As described above, according to this embodiment, the direction in which the water absorbing resin 3 protrudes can be controlled. Hence, for example, in the case in which the liquid absorbing sheet 10 is disposed in a small space, and the water absorbing resin 3 is desired to protrude in a predetermined direction, this case can be realized by disposing the liquid absorbing sheet 10 in an appropriate direction.

Third Embodiment

Figure 11:
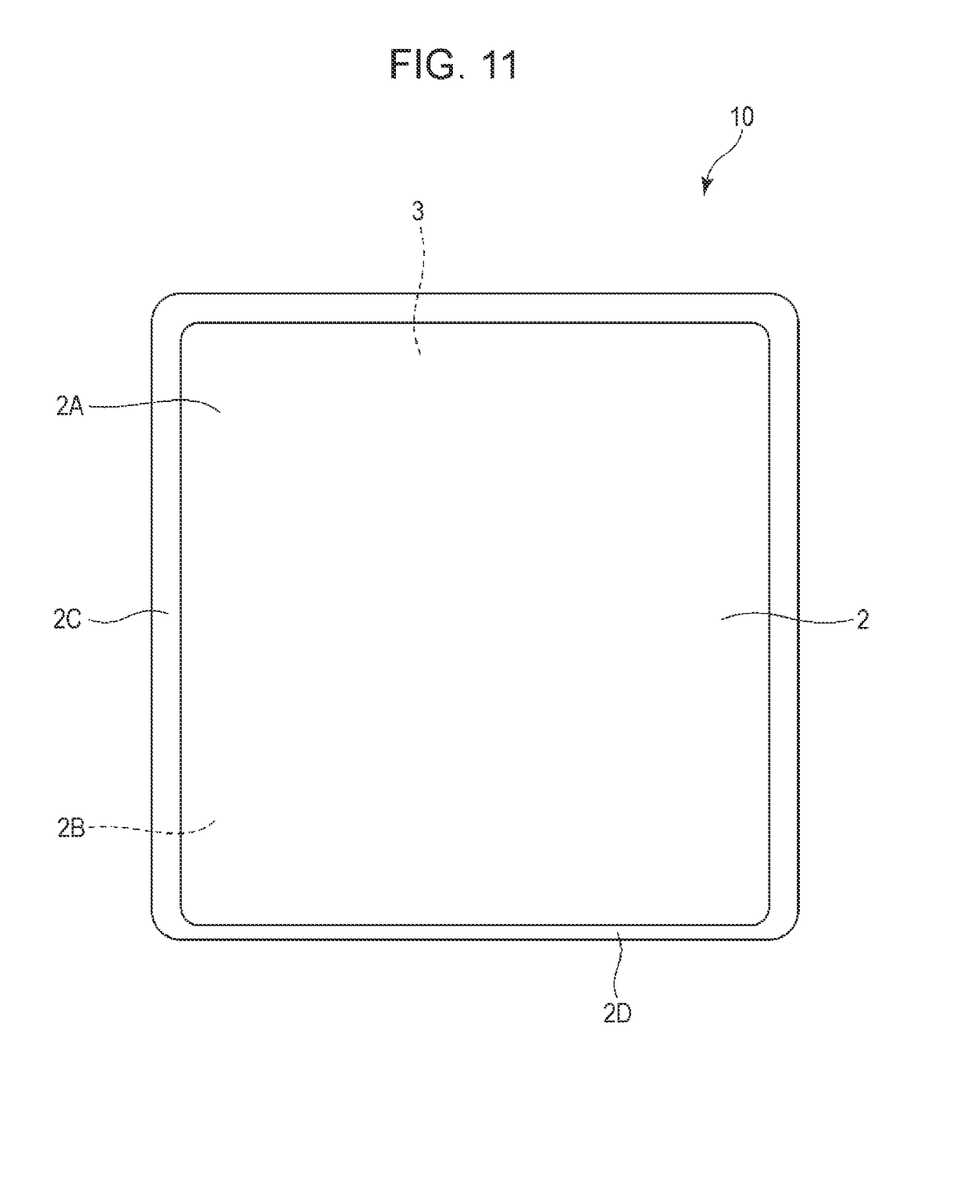
FIG. 11 is a plan view of a third embodiment of the liquid absorbing sheet of the present disclosure.

FIG. 11 is a plan view of a third embodiment of the liquid absorbing sheet of the present disclosure.

Hereinafter, although the third embodiment of the liquid absorbing sheet of the present disclosure will be described with reference this drawing, points different from those of the embodiments described above will be primarily described, and items similar to those described above will be omitted.

As shown in FIG. 11, in this embodiment, in the bonding portion 2C, a part 2D corresponding to a lower-side part of the margin in FIG. 11 has a smaller width. This part 2D is more likely to be broken as compared to the other part of the bonding portion 2C. As described above, the bonding portion 2C has the part 2D which is a preferential breaking part to be preferentially broken by the swelling of the water absorbing resin 3 as compared to the other part of the bonding portion 2C. Accordingly, the direction in which the water absorbing resin 3 protrudes can be controlled. Hence, for example, in the case in which the liquid absorbing sheet 10 is disposed in a small space, and the water absorbing resin 3 is desired to protrude in a predetermined direction, this case can be realized by disposing the liquid absorbing sheet 10 in an appropriate direction.

In addition, the part 2D which is a preferential breaking part has a small width as compared to that of the other part of the bonding portion 2C. According to the structure as described above, by a simple method in which the width of a part to be heat-pressurized by the heating pressure jig 5 as shown in FIG. 7 is adjusted, the part 2D which is a preferential breaking part can be formed.

Figure 12:
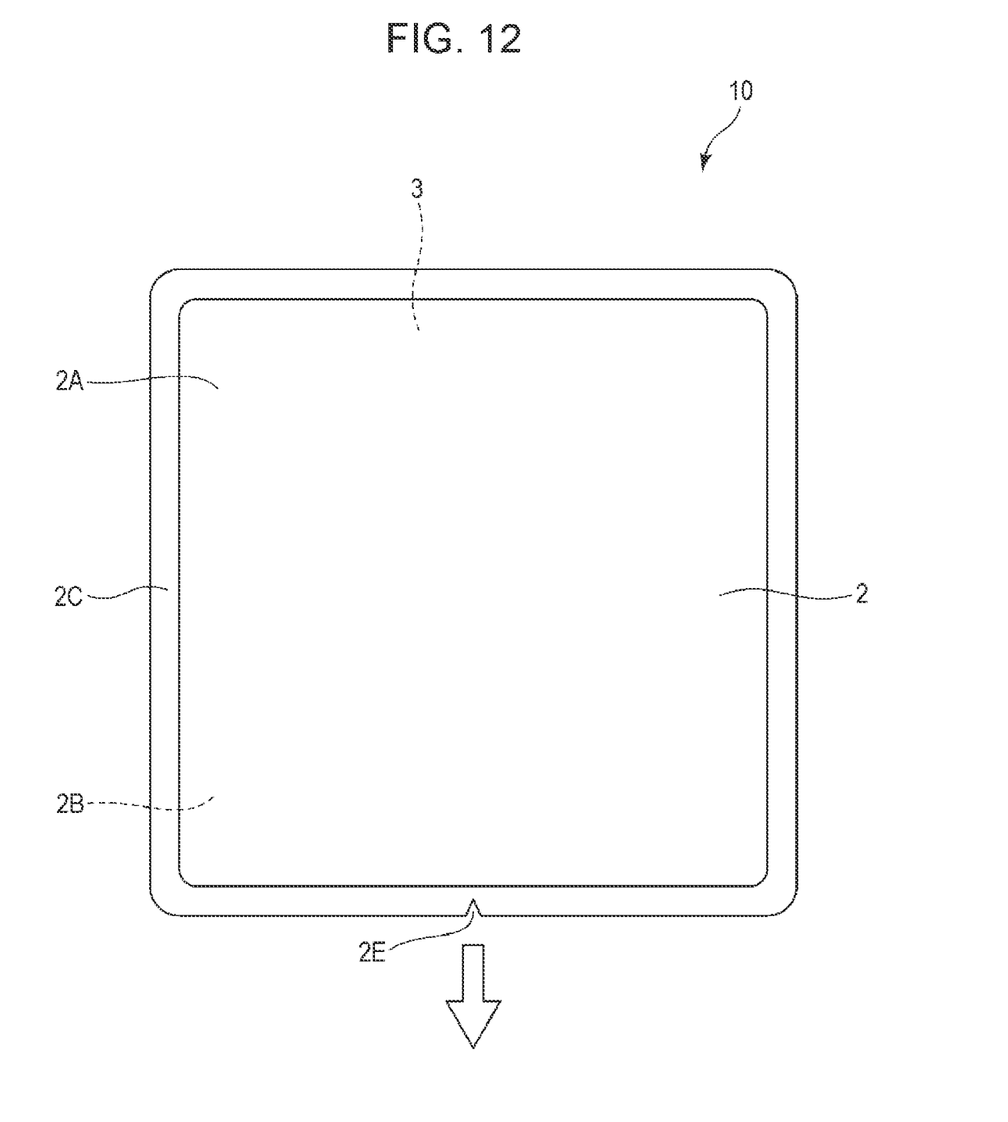
FIG. 12 is a plan view of a modified example of the liquid absorbing sheet of the present disclosure.

In addition, as shown in FIG. 12, a part having a small width as compared to that of the other part may also be formed by forming a notch 2E in a part corresponding to the bonding portion 2C. In this case, the part in which the notch 2E is formed functions as a preferential breaking part.

In addition, the preferential breaking part is not limited to the structures described above, and even when the width of the bonding portion 2C is the same all along the length thereof, the preferential breaking part may be formed by partially decreasing the bonding strength thereof.

Although the embodiments of the liquid absorbing sheet of the present disclosure have been described with reference to the drawings, the present disclosure is not limited thereto, and the individual components forming the liquid absorbing sheet may be replaced with arbitrary components having functions similar to those described above.

In addition, the liquid absorbing sheet of the present disclosure may be formed in combination of at least two structural features of the embodiments described above.

What is claimed is:

1. A liquid absorbing sheet comprising:
    a receiving base material which has a liquid permeability and which includes a first base material, a second base material, and a bonding portion at which at least a part of an outermost edge of the first base material and at least a part of an outermost edge of the second base material are bonded to each other, the first base material and the second base material being composed of a material including fibers; and a water absorbing resin which has a water absorbing property, which is swelled in association with water absorption, and which is received in a portion between the first base material and the second base material surrounded by the bonding portion, wherein the bonding portion defines at least a part of an outermost edge of the liquid absorbing sheet and has a first breaking part having a width smaller than the other part of the bonding portion, the at least the part of the outermost edge of the first base material and the at least the part of the outermost edge of the second base material are bonded by a water-soluble adhesive that is soluble to the liquid, and the bonding portion is at least partially broken at the first breaking part when the water absorbing resin is swelled and the water-soluble adhesive is dissolved by the liquid so that the water absorbing resin flows out of the receiving base material through a broken section of the bonding portion.

2. The liquid absorbing sheet according to claim 1, wherein the water absorbing resin has a weight of 20% or more of a total weight of the liquid absorbing sheet.

3. The liquid absorbing sheet according to claim 1, wherein the bonding portion is at least partially broken when the water absorbing resin absorbs a liquid in an amount of 0.5 g/cm$^3$ or more.

4. The liquid absorbing sheet according to claim 1, wherein the water absorbing resin has a weight per unit area of the liquid absorbing sheet of 100 g/m$^2$ or more.

5. The liquid absorbing sheet according to claim 1, wherein the water absorbing resin is bonded to at least one of the first base material and the second base material.

6. The liquid absorbing sheet according to claim 1, wherein the bonding portion defines a notch that constitutes the first breaking part.

7. The liquid absorbing sheet according to claim 1, wherein a part of the bonding portion has a bonding strength smaller than a bonding strength of the rest of the bonding portion.

8. The liquid absorbing sheet according to claim 1, wherein when a volume of the water absorbing resin before absorbing water is represented by V1, and a volume of the water absorbing resin after maximally absorbing water is represented by V2, V2/V1 is 2 to 1,000.

9. The liquid absorbing sheet according to claim 8, wherein

V2/V1 is 5 to 250.

* * * * *